D. T. HASTINGS & A. J. NEERKEN.
FASTENER FOR VEHICLE TOPS.
APPLICATION FILED OCT. 22, 1914.
1,168,394.
Patented Jan. 18, 1916.
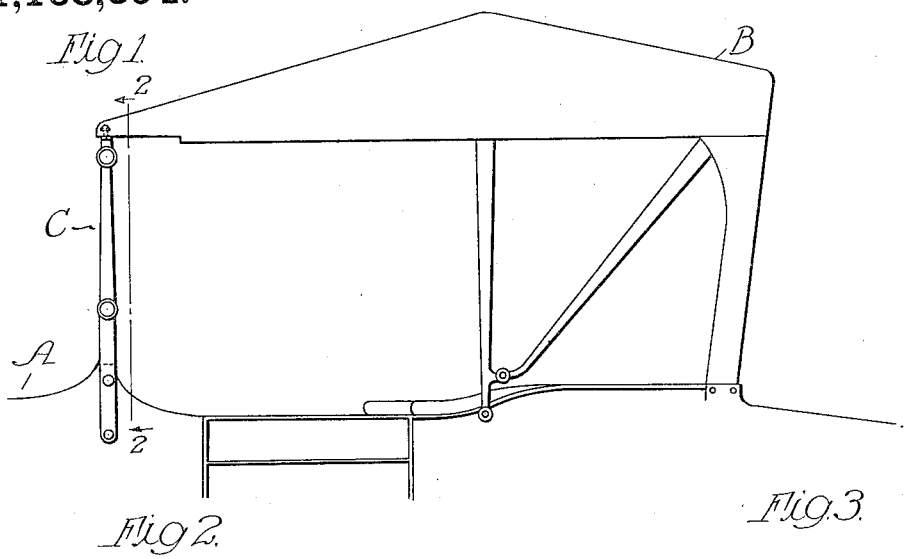
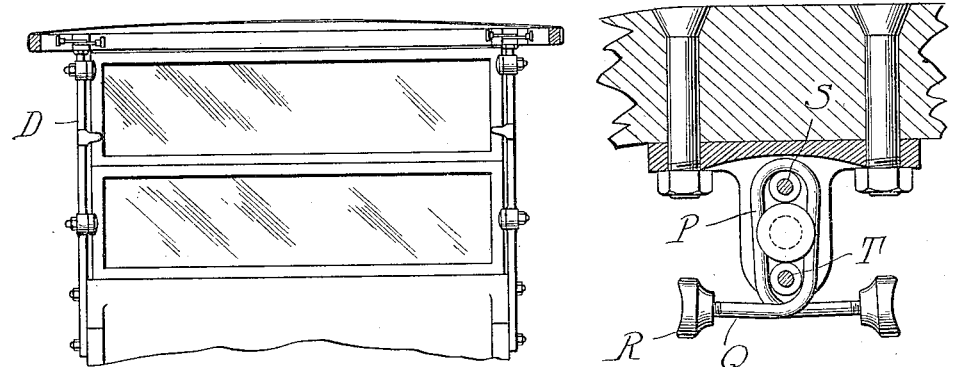
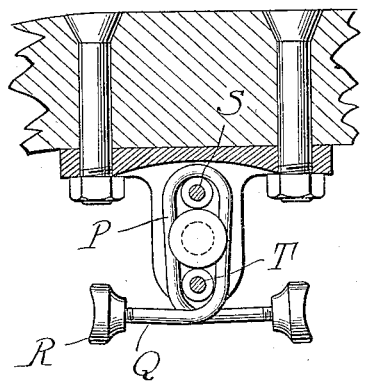
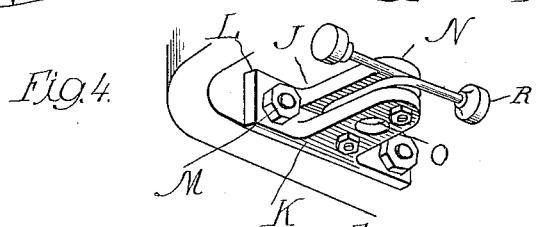
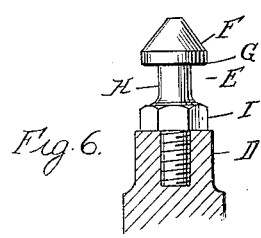
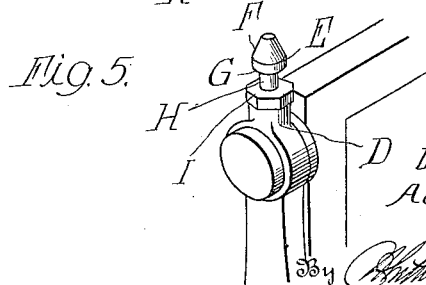
Inventor
Donald T. Hastings &
Adrian J. Neerken
Witnesses

UNITED STATES PATENT OFFICE.

DONALD T. HASTINGS AND ADRIAN J. NEERKEN, OF DETROIT, MICHIGAN, ASSIGNORS TO HUPP MOTOR CAR COMPANY, OF DETROIT, MICHIGAN, A CORPORATION OF MICHIGAN.

FASTENER FOR VEHICLE-TOPS.

1,168,394.   Specification of Letters Patent.   Patented Jan. 18, 1916.

Application filed October 22, 1914. Serial No. 868,023.

*To all whom it may concern:*

Be it known that we, DONALD T. HASTINGS and ADRIAN J. NEERKEN, citizens of the United States of America, residing at Detroit, in the county of Wayne and State of Michigan, have invented certain new and useful Improvements in Fasteners for Vehicle-Tops, of which the following is a specification, reference being had therein to the accompanying drawings.

The invention relates to fasteners for vehicle tops and has among the objects thereof to provide a simple and efficient connection between the forward end of the top and the wind shield which will permit the top to be easily and quickly secured to the wind shield or readily disengaged therefrom; to provide a fastener that will automatically lock the end of the top to the wind shield; and further, to provide a simple and efficient construction of fastener.

The invention resides in the novel construction, arrangement and combination of parts as will more fully hereinafter appear.

In the drawings,—Figure 1 is a partial side elevation of a motor vehicle having the invention applied thereto; Fig. 2 is a section on the line 2—2 of Fig. 1; Fig. 3 is a sectional view illustrating a detail of construction; Figs. 4 and 5 are perspective views of the coöperating portions of the fastener; and Fig. 6 illustrates a detail of construction.

In motor vehicles it is quite customary to anchor the forward end of the top to the wind shield so as to give the desired rigidity to the top, but with the locking means heretofore in general use, it has been necessary to first engage the coöperating parts of the locking connection between the top and shield and then to adjust the thumb-nut or other similar means to secure the coöperating portions of the connection together. With the structure embodying the invention, when the coöperating portions of the fastener are engaged, they will automatically lock, but although when locked they are secured against accidental disengagement, the fastener parts may be readily unlocked and quickly disengaged by the operator.

Referring to the one embodiment of the invention illustrated in the drawings, A designates the body of a motor vehicle, B the top which is of the folding type, and C is the wind shield. The latter is provided with standards D on opposite sides thereof, each carrying at its upper end a member E which forms a part of the fastener. The member E has a tapered head F and is provided with a shoulder G at the base of the head.

H is a shank below the head having its lower end threaded to engage the upper end of the standard D, and formed integral with the shank H is a wrench-engaging portion I. The latter and the shoulder G form spaced abutments.

Carried by the top is a member J adapted to have an interlocking engagement with the member E. The member J comprises a bracket K having laterally-extending ears L which are connected by bolts M with the front bow of the top. Projecting forwardly from the ears L is a bifurcated portion, the bifurcations N of which are each provided with apertures O which are alined. Intermediate the bifurcations N is a spring P having a loop-shaped portion, the legs of which extend upon opposite sides of the apertures O and which terminate at their outer ends in laterally-extending portions Q carrying finger-pieces R. The spring loop is secured within the bifurcations by means of spaced pins S and T arranged adjacent opposite ends of the loop. Normally the legs of the loop are contracted to a width less than that of the head F, but when the latter is engaged with the member J, the head in passing through the aperture O of the lower bifurcation N, because of the tapering form, forces the legs of the loop apart until the shoulder G has passed above the spring. The resiliency of the latter then moves the legs of the loop inwardly beneath the head, securely locking the member J to the member E.

When it is desired to disengage the parts of the fastener it is merely necessary for the operator to grasp the finger-pieces R and press them toward each other. This will spread the legs of the loop and allow the member J to be raised out of engagement with the member E.

As will be noted, the member J is arranged within the top in such a position as to be concealed.

From the foregoing description it will be readily apparent that a construction of fastener is provided which not only is simple, but is such that when employed as a top fastener, will allow the top to be readily engaged with or disengaged from the windshield.

What we claim as our invention is:—

1. A fastener, comprising a headed member, and a member adapted to be engaged therewith, composed of a bracket having a bifurcated portion, the furcations being formed with alined apertures for receiving the headed member, means arranged intermediate the furcations for engaging the head and means for securing the bracket to a support.

2. A fastener, comprising a headed member, and a member adapted to be engaged therewith composed of a bracket apertured to receive the headed member, a looped resilient member mounted upon said bracket having portions for oppositely engaging beneath the head, and pins carried by said bracket at each side of the aperture therein and passing through the looped member to anchor the same to said bracket.

3. A fastener, comprising a headed member, and a member adapted to be engaged therewith composed of a bracket having a bifurcated portion, the furcations being apertured to receive the headed member, a looped resilient member mounted upon said bracket between said furcations, having portions for oppositely engaging beneath the head, and means passing through the looped member and connecting said furcations to anchor said looped member to the bracket.

In testimony whereof we affix our signatures in presence of two witnesses.

DONALD T. HASTINGS.
ADRIAN J. NEERKEN.

Witnesses:
GRANVILLE C. ALDRICH,
FRANK E. WATTS.

Copies of this patent may be obtained for five cents each, by addressing the "Commissioner of Patents Washington, D. C."